US011889870B2

(12) United States Patent
Lee et al.

(10) Patent No.: US 11,889,870 B2
(45) Date of Patent: Feb. 6, 2024

(54) AEROSOL GENERATING DEVICE HAVING FLOODING DETECTING FUNCTION AND METHOD THEREFOR

(71) Applicant: KT&G CORPORATION, Daejeon (KR)

(72) Inventors: Jae Min Lee, Siheung-si (KR); Sang Kyu Park, Hwaseong-si (KR)

(73) Assignee: KT&G CORPORATION, Daejeon (KR)

( * ) Notice: Subject to any disclaimer, the term of this patent is extended or adjusted under 35 U.S.C. 154(b) by 589 days.

(21) Appl. No.: 17/059,860

(22) PCT Filed: Mar. 16, 2020

(86) PCT No.: PCT/KR2020/003603
§ 371 (c)(1),
(2) Date: Nov. 30, 2020

(87) PCT Pub. No.: WO2020/190000
PCT Pub. Date: Sep. 24, 2020

(65) Prior Publication Data
US 2021/0195959 A1     Jul. 1, 2021

(30) Foreign Application Priority Data

Mar. 20, 2019   (KR) .......................... 10-2019-0031773

(51) Int. Cl.
*A24F 40/53*     (2020.01)
*A24F 40/90*     (2020.01)
*G01D 21/00*     (2006.01)

(52) U.S. Cl.
CPC .............. *A24F 40/53* (2020.01); *A24F 40/90* (2020.01); *G01D 21/00* (2013.01)

(58) Field of Classification Search
CPC .......... A24F 40/53; A24F 40/90; A24F 40/10; A24F 40/51; A24F 40/20; A24F 40/80;
(Continued)

(56) References Cited

U.S. PATENT DOCUMENTS

| 10,655,938 B2 | 3/2020 | Flick |
| 2016/0106156 A1 | 4/2016 | Qiu |

(Continued)

FOREIGN PATENT DOCUMENTS

| CN | 106170218 A | 11/2016 |
| CN | 106463241 A | 2/2017 |

(Continued)

OTHER PUBLICATIONS

Extended European Search Report dated Aug. 6, 2021, issued by the European Patent Office in application No. 20774763.5.
(Continued)

*Primary Examiner* — Alvaro E Fortich
(74) *Attorney, Agent, or Firm* — Sughrue Mion, PLLC

(57) ABSTRACT

Provided is an aerosol generating device including at least one component accommodating space having an opening on an outer surface of the aerosol generating device and allowing a removable component to be accommodated therein through the opening; a controller configured to periodically generate a test signal; a detection signal generator configured to generate a flooding detection signal based on the test signal when a liquid is introduced through the opening; and a detection signal transmitter configured to receive a generated flooding detection signal and transmit the received flooding detection signal to the controller, wherein the controller determines whether the aerosol generating device is flooded based on the flooding detection signal.

15 Claims, 7 Drawing Sheets

(58) Field of Classification Search
CPC ..... G01D 21/00; A61M 11/042; A61M 15/06; A61M 2205/8206; H05B 1/0202
See application file for complete search history.

(56) References Cited

U.S. PATENT DOCUMENTS

| | | | |
|---|---|---|---|
| 2016/0157523 A1 | 6/2016 | Liu | |
| 2017/0114779 A1 | 4/2017 | Abeyasekera | |
| 2018/0132530 A1* | 5/2018 | Rogers | A24F 40/53 |
| 2018/0249764 A1 | 9/2018 | Qiu | |
| 2018/0332895 A1* | 11/2018 | Li | A61M 11/042 |
| 2019/0166913 A1* | 6/2019 | Trzecieski | A61M 15/06 |
| 2019/0223507 A1 | 7/2019 | Qiu | |
| 2020/0205476 A1* | 7/2020 | Wen | A24F 40/10 |
| 2020/0214358 A1* | 7/2020 | Qiu | A24F 40/53 |

FOREIGN PATENT DOCUMENTS

| | | |
|---|---|---|
| CN | 107505856 A | 12/2017 |
| EP | 3 357 360 A2 | 8/2018 |
| JP | 2001-197175 A | 7/2001 |
| KR | 10-2004-0110271 A | 12/2004 |
| KR | 20-0417538 Y1 | 5/2006 |
| KR | 10-1296158 B1 | 8/2013 |
| KR | 10-2013-0130763 A | 12/2013 |
| KR | 10-2016-0086118 A | 7/2016 |
| KR | 10-2017-0072738 A | 6/2017 |
| WO | 2012/134117 A2 | 10/2012 |
| WO | 2017/076247 A1 | 5/2017 |
| WO | 2018/050072 A1 | 3/2018 |
| WO | 2019/037583 A1 | 2/2019 |

OTHER PUBLICATIONS

Chinese Office Action dated Apr. 27, 2023 in Chinese Application No. 202080002770.3.
International Search Report of PCT/KR2020/003603 dated Nov. 17, 2020 [PCT/ISA/210].
Written Opinion of PCT/KR2020/003603 dated Nov. 17, 2020 [PCT/ISA/237].
Korean Office Action of KR10-2019-0031773 dated Nov. 6, 2020.
Chinese Office Action dated Oct. 17, 2023 in Chinese Application No. 202080002770.3.

* cited by examiner

[Fig. 1]
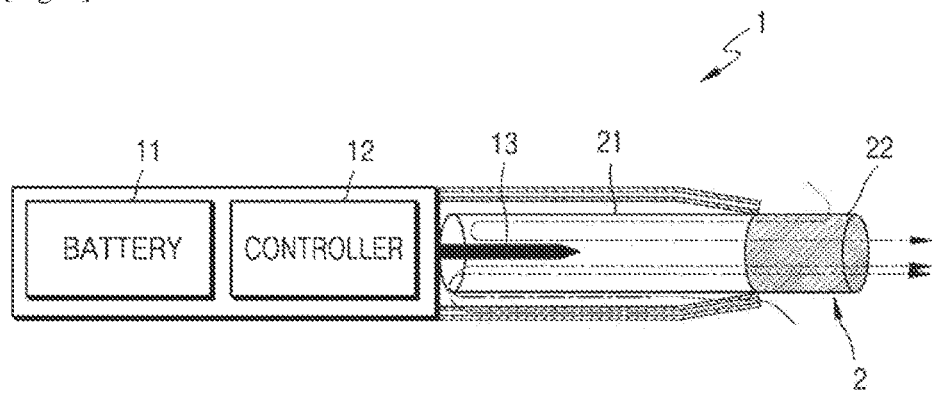
[Fig. 2]
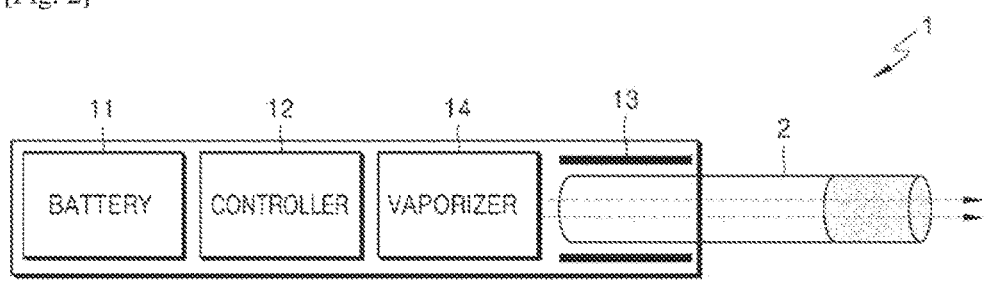
[Fig. 3]
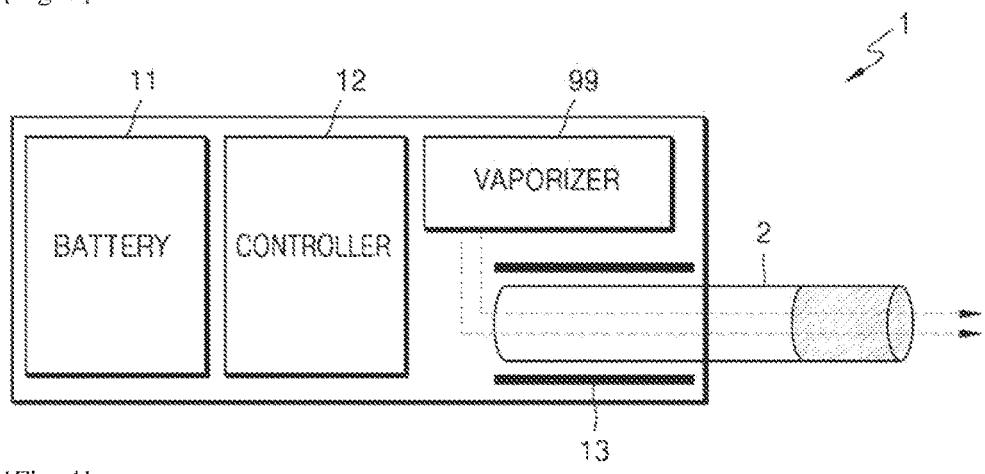
[Fig. 4]
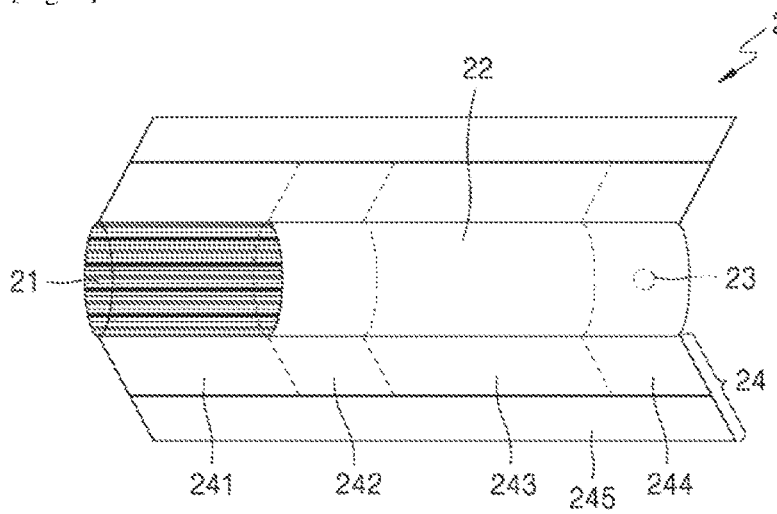

[Fig. 5]
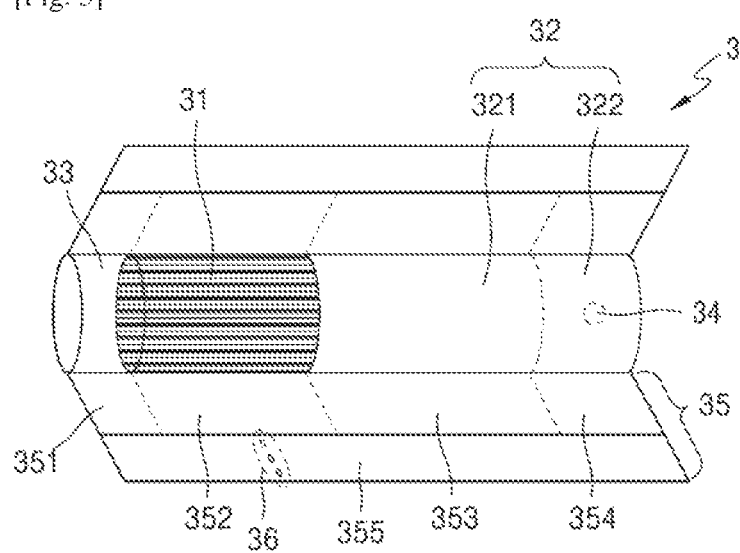

[Fig. 6]
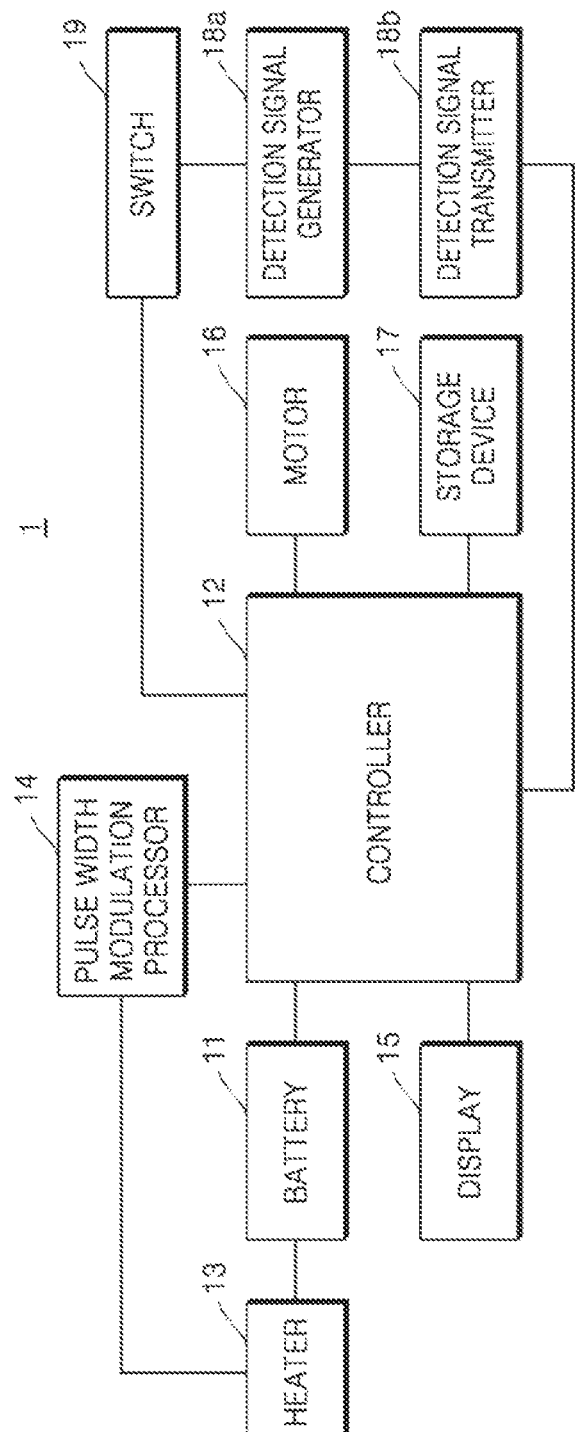

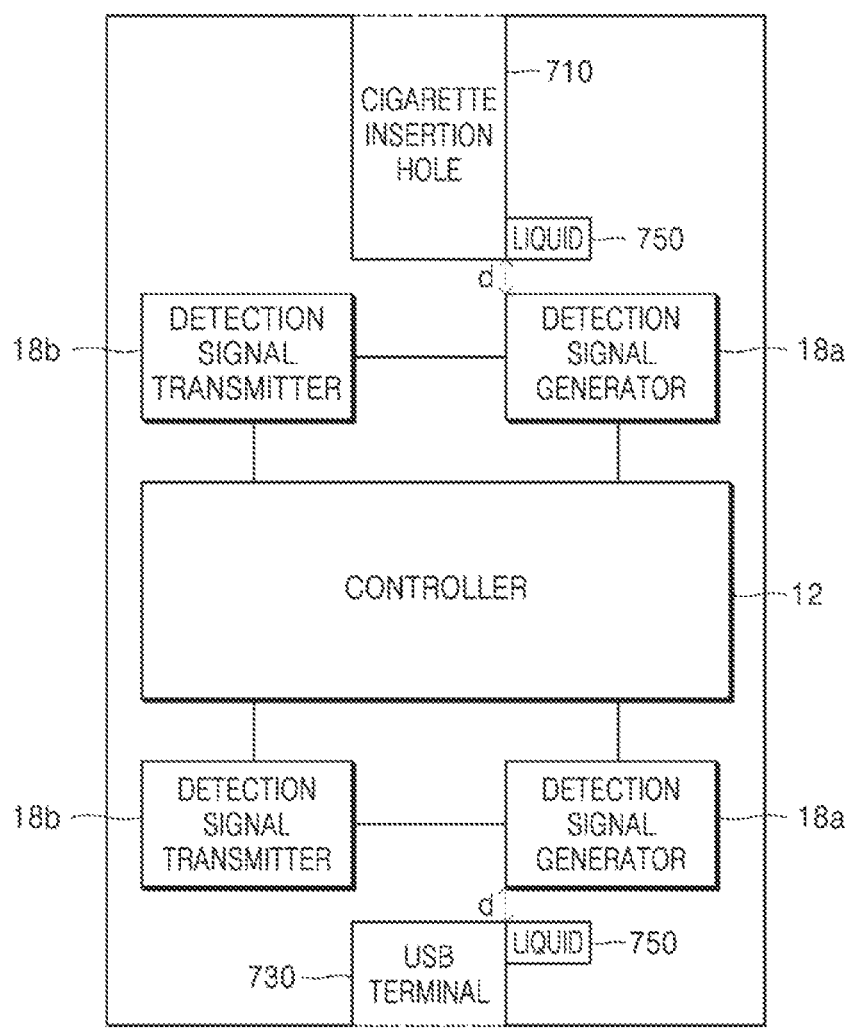
[Fig. 7]
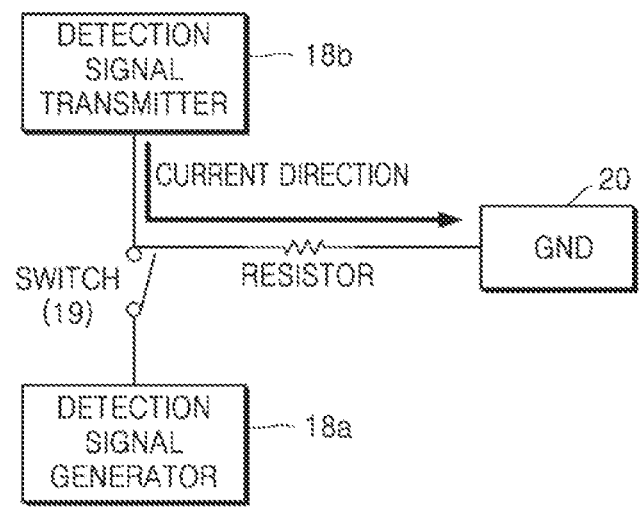
[Fig. 8A]

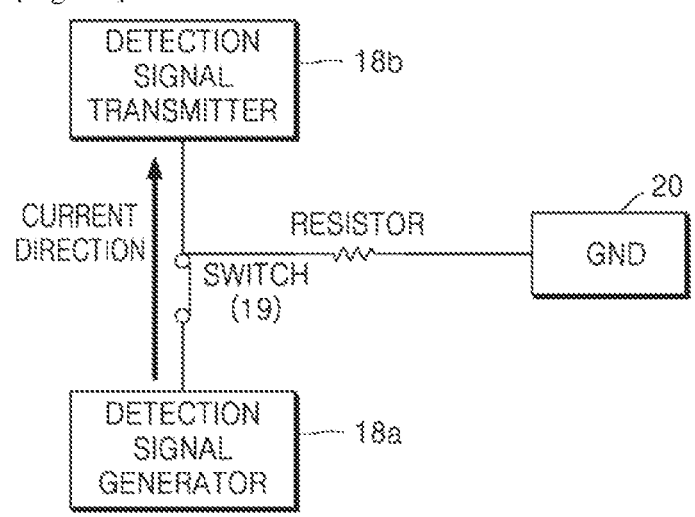

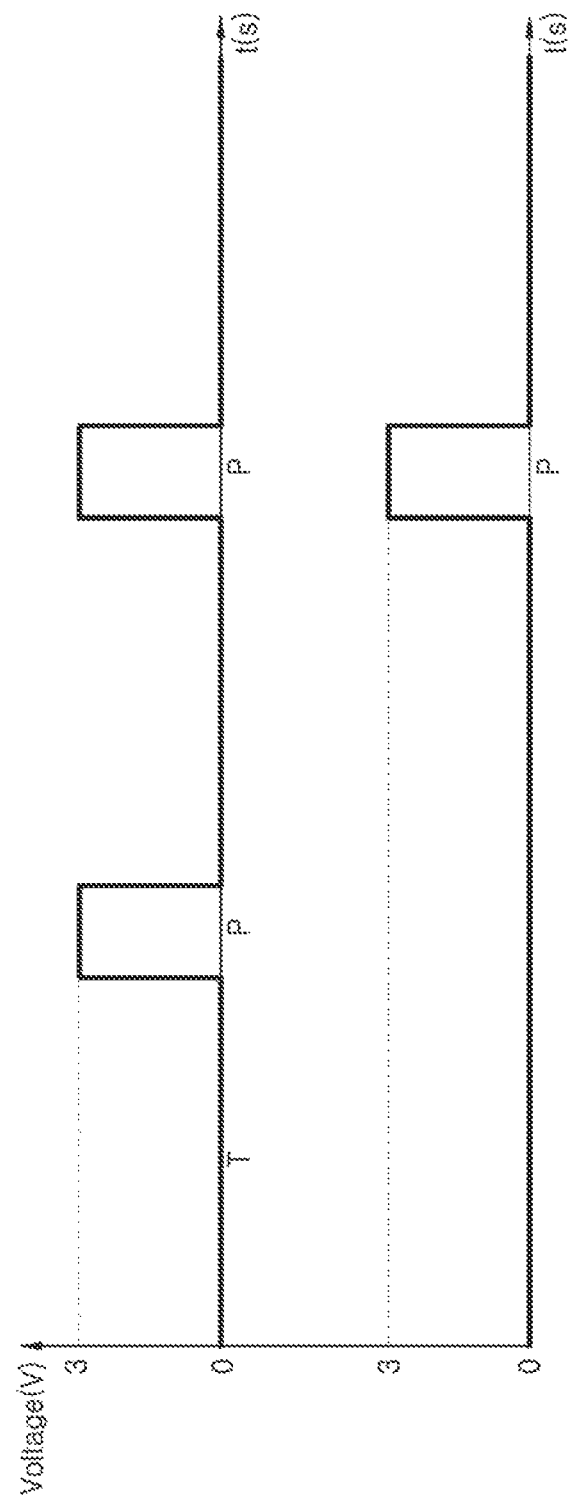
[Fig. 9]

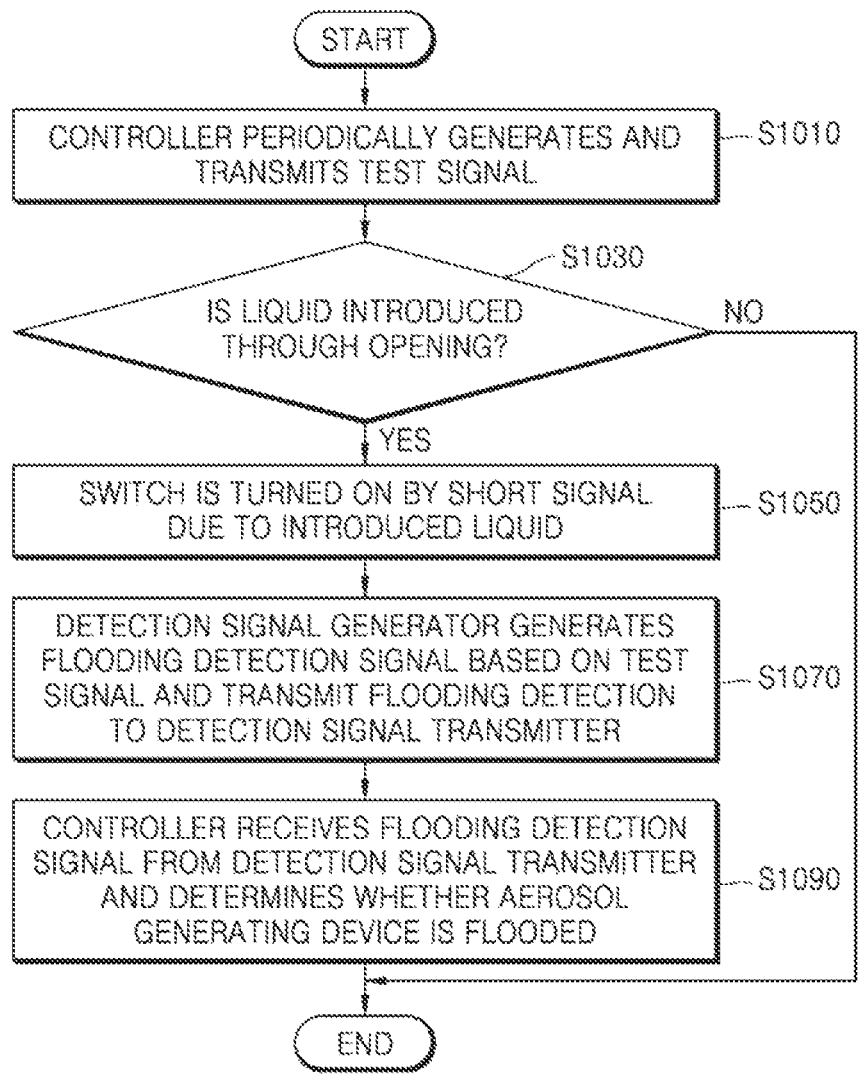

AEROSOL GENERATING DEVICE HAVING FLOODING DETECTING FUNCTION AND METHOD THEREFOR

CROSS REFERENCE TO RELATED APPLICATIONS

This application is a National Stage of International Application No. PCT/KR2020/003603 filed on Mar. 16, 2020, claiming priority based on Korean Patent Application No. 10-2019-0031773 filed on Mar. 20, 2019.

TECHNICAL FIELD

One or more exemplary embodiments relate to an aerosol generating device having a flooding detecting function and a method therefor, and more particularly, to an aerosol generating device capable of activating a function for quickly preventing damage to the aerosol generating device by detecting flooding in a space such as a cigarette insertion hole or a USB terminal.

BACKGROUND ART

Recently, there is a growing demand for alternative methods for resolving problems of a regular combustion-type cigarette. For example, there is an increasing demand for a method of generating aerosol by heating an aerosol generating material in cigarettes, rather than by burning cigarettes. In this regard, researches on heating-type cigarettes and heating-type aerosol generating apparatuses are being actively carried out.

An aerosol generating device is a portable electronic device, and, since it is structurally impossible that all exposed surfaces thereof are waterproofed, a liquid may be easily introduced therein. When an aerosol generating device is operated with liquid introduced therein, a circuit board included in the aerosol generating device may likely be damaged, and thus it is necessary for a controller to quickly detect flooding and notify the flooding to a user.

DISCLOSURE OF INVENTION

Technical Problem

One or more exemplary embodiments provide an aerosol generating device with improved flooding detecting function that enables quick detection of introduction of liquid when the liquid is introduced therein.

Additional aspects will be set forth in part in the description which follows and, in part, will be apparent from the description, or may be learned by practice of the presented exemplary embodiments of the disclosure.

Solution to Problem

According to one or more exemplary embodiments, an aerosol generating device includes an component accommodating space having an opening on an outer surface of the aerosol generating device such that a removable component is accommodated in the component accommodating space through the opening; a controller configured to periodically generate a test signal; a detection signal generator configured to generate a flooding detection signal based on the test signal when a liquid is introduced through the opening; and a detection signal transmitter configured to receive a generated flooding detection signal and transmit the received flooding detection signal to the controller, wherein the controller determines whether the aerosol generating device is flooded based on the flooding detection signal.

According to one or more exemplary embodiments, a method of detecting flooding of aerosol generating device, the method includes generating, by a controller, a test signal periodically; generating, by the detection signal generator, a flooding detection signal based on the test signal when a liquid is introduced through an opening of a component accommodating space that is formed on an outer surface of the aerosol generating device such that a removable component is accommodated in the component accommodating space through the opening; transmitting, by a detection signal transmitter, the flooding detection signal to the controller; and determining, by the controller, whether the aerosol generating device is flooded based on the flooding detection signal.

According to one or more exemplary embodiments, there is provided a computer-readable recording medium having recorded thereon a computer program for implementing the method.

Also, to resolve the above technical goal, an aerosol generating device according to another exemplary embodiment may be provided to a user.

Advantageous Effects of Invention

In one or more exemplary embodiments, when a liquid flows into the aerosol generating device, the flooding of the aerosol generating device may be detected through a switch circuit which is shorted by the liquid, without a separate liquid sensor. As a result, a size of the aerosol generating device may be reduced because it is not necessary to allocate a space for the liquid sensor in the aerosol generating device.

BRIEF DESCRIPTION OF DRAWINGS

The above and other aspects, features, and advantages of certain exemplary embodiments of the disclosure will be more apparent from the following description taken in conjunction with the accompanying drawings, in which:

FIGS. 1 through 3 are diagrams showing examples in which a cigarette is inserted into an aerosol generating device.

FIGS. 4 and 5 are diagrams showing examples of a cigarette;

FIG. 6 is a schematic block diagram of an aerosol generating device according to one or more exemplary embodiments;

FIG. 7 is a schematic view of an aerosol generating device according to one or more exemplary embodiments;

FIG. 8A is a diagram showing an example of a circuit, to describe the function of the switch described above with reference to FIGS. 6 and 7 in detail;

FIG. 8B is a diagram showing another example of a circuit, to describe the function of the switch described above with reference to FIGS. 6 and 7 in detail;

FIG. 9 is a diagram showing a schematic comparison between a test signal transmitted by a controller and a flooding detection signal received by the controller; and FIG. 10 is a flowchart of a method of detecting flooding of an aerosol generating device according to one or more exemplary embodiments.

BEST MODE FOR CARRYING OUT THE INVENTION

According to one or more exemplary embodiments, an aerosol generating device having a flooding detecting function, the aerosol generating device includes a component accommodating space having an opening on an outer surface of the aerosol generating device and allowing a removable component to be accommodated therein through the opening; a controller configured to periodically generate a test signal; a detection signal generator configured to generate a flooding detection signal based on the test signal when a liquid is introduced through the opening; and a detection signal transmitter configured to receive a generated flooding detection signal and transmit the received flooding detection signal to the controller, wherein the controller determines whether the aerosol generating device is flooded based on the flooding detection signal.

The removable component may be a USB charging terminal or a cigarette that contains an aerosol generating substance.

The detection signal transmitter may transmit the flooding detection signal to the controller after receiving the flooding detection signal from the detection signal generator.

The detection signal generator may generate the flooding detection signal based on the test signal being received within a predetermined time after the liquid is introduced.

The detection signal generator may be located within a first predetermined distance from the opening.

The detection signal generator may be electrically connected to the detection signal transmitter by the liquid introduced through the opening such that the detection signal transmitter receives the flooding detection signal from the detection signal generator.

The controller may determine whether the aerosol generating device is flooded based on a result of comparing the flooding detection signal with a pre-stored reference flooding signal.

According to one or more exemplary embodiments, a method of detecting flooding of aerosol generating device, the method includes generating, by a controller, a test signal periodically; generating, by the detection signal generator, a flooding detection signal based on the test signal when a liquid is introduced through an opening of a component accommodating space that is formed on an outer surface of the aerosol generating device and allows a removable component to be accommodated in the component accommodating through the opening; transmitting, by a detection signal transmitter, the flooding detection signal to the controller, and determining, by the controller, whether the aerosol generating device is flooded based on the flooding detection signal.

The removable component may be a USB charging terminal or a cigarette that contains an aerosol generating substance.

The transmitting of the flooding detection signal may include receiving the flooding detection signal from the detection signal generator.

The generating of the flooding detection signal may include generating the flooding detection signal based on the test signal being received within a predetermined time after the liquid is introduced.

The detection signal generator may be located within a first predetermined distance from the opening.

The transmitting of the flood detection signal may include receiving, by the detection signal transmitter, the flooding detection signal from the detection signal generator after the detection signal generator is electrically connected to the detection signal transmitter by the liquid introduced through the opening.

The determining may include determining whether the aerosol generating device is flooded based on a result of comparing the flooding detection signal with a pre-stored reference flooding signal.

MODE FOR THE INVENTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

General terms that are now widely used are selected in the description of exemplary embodiments, as far as possible, taking into account functions in the present disclosure, but the terms used herein may be changed according to the intention of one of skill in the art, precedents, the advent of new technology, or the like. There are terms discretionally selected by an applicant on particular occasions. These terms will be explained in detail in relevant description. Therefore, terms used herein are not just names but should be defined based on the meaning of the terms and the whole content of the present disclosure.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Exemplary embodiments of the present disclosure will be described in detail hereinafter with reference to the accompanying drawings so as to be easily implemented by one of ordinary skill in the art to which the present disclosure belongs. The present disclosure may, however, be embodied in many different forms and is not limited to the exemplary embodiments set forth herein.

FIGS. 1 to 3 are diagrams showing examples in which a cigarette is inserted into an aerosol generating device.

Referring to FIG. 1, the aerosol generating device 1 may include a battery 11, a controller 12, and a heater 13. Referring to FIGS. 2 and 3, the aerosol generating device 1 may further include a vaporizer 14. Also, the cigarette 2 may be inserted into an inner space of the aerosol generating device 1.

FIGS. 1 through 3 illustrate components of the aerosol generating device 1, which are related to the present exemplary embodiment. Therefore, it will be understood by one of ordinary skill in the art related to the present exemplary embodiment that other components may be further included in the aerosol generating device 1, in addition to the components illustrated in FIGS. 1 through 3.

Also, FIGS. 2 and 3 illustrate that the aerosol generating device 1 includes the heater 13. However, as necessary, the heater 13 may be omitted.

FIG. 1 illustrates that the battery 11, the controller 12, and the heater 13 are arranged in series. Also, FIG. 2 illustrates that the battery 11, the controller 12, the vaporizer 14, and the heater 13 are arranged in series. Also, FIG. 3 illustrates that the vaporizer 14 and the heater 13 are arranged in parallel. However, the internal structure of the aerosol generating device 1 is not limited to the structures illustrated in FIGS. 1 through 3. In other words, according to the design of the aerosol generating device 1, the battery 11, the controller 12, the heater 13, and the vaporizer 14 may be differently arranged.

When the cigarette 2 is inserted into the aerosol generating device 1, the aerosol generating device 1 may operate the heater 13 and/or the vaporizer 14 to generate aerosol from the cigarette 2 and/or the vaporizer 14. The aerosol generated by the heater 13 and/or the vaporizer 14 is delivered to a user by passing through the cigarette 2.

According to necessity, even when the cigarette 2 is not inserted into the aerosol generating device 1, the aerosol generating device 1 may heat the heater 13.

The battery 11 may supply power to be used for the aerosol generating device 1 to operate. For example, the battery 11 may supply power to heat the heater 13 or the vaporizer 14, and may supply power for operating the controller 12. Also, the battery 11 may supply power for operations of a display, a sensor, a motor, etc. mounted in the aerosol generating device 1.

The controller 12 may generally control operations of the aerosol generating device 1. In detail, the controller 12 may control not only operations of the battery 11, the heater 13, and the vaporizer 14, but also operations of other components included in the aerosol generating device 1. Also, the controller 12 may check a state of each of the components of the aerosol generating device 1 to determine whether or not the aerosol generating device 1 is able to operate.

The controller 12 may include at least one processor. A processor can be implemented as an array of a plurality of logic gates or can be implemented as a combination of a microprocessor and a memory in which a program executable in the microprocessor is stored. It will be understood by one of ordinary skill in the art that the processor can be implemented in other forms of hardware.

The heater 13 may be heated by the power supplied from the battery 11. For example, when the cigarette 2 is inserted into the aerosol generating device 1, the heater 13 may be located outside the cigarette 2. Thus, the heated heater 13 may increase a temperature of an aerosol generating material in the cigarette 2.

The heater 13 may include an electro-resistive heater. For example, the heater 13 may include an electrically conductive track, and the heater 13 may be heated when currents flow through the electrically conductive track. However, the heater 13 is not limited to the example described above and may include all heaters which may be heated to a desired temperature. Here, the desired temperature may be pre-set in the aerosol generating device 1 or may be set as a temperature desired by a user.

As another example, the heater 13 may include an induction heater. In detail, the heater 13 may include an electrically conductive coil for heating a cigarette in an induction heating method, and the cigarette may include a susceptor which may be heated by the induction heater.

For example, the heater 13 may include a tube-type heating element, a plate-type heating element, a needle-type heating element, or a rod-type heating element, and may heat the inside or the outside of the cigarette 2, according to the shape of the heating element.

Also, the aerosol generating device 1 may include a plurality of heaters 13. Here, the plurality of heaters 13 may be inserted into the cigarette 2 or may be arranged outside the cigarette 2. Also, some of the plurality of heaters 13 may be inserted into the cigarette 2 and the others may be arranged outside the cigarette 2. In addition, the shape of the heater 13 is not limited to the shapes illustrated in FIGS. 1 through 3 and may include various shapes.

The vaporizer 14 may generate aerosol by heating a liquid composition and the generated aerosol may pass through the cigarette 2 to be delivered to a user. In other words, the aerosol generated via the vaporizer 14 may move along an air flow passage of the aerosol generating device 1 and the air flow passage may be configured such that the aerosol generated via the vaporizer 14 passes through the cigarette 2 to be delivered to the user.

For example, the vaporizer 14 may include a liquid storage, a liquid delivery element, and a heating element, but it is not limited thereto. For example, the liquid storage, the liquid delivery element, and the heating element may be included in the aerosol generating device 1 as independent modules.

The liquid storage may store a liquid composition. For example, the liquid composition may be a liquid including a tobacco-containing material having a volatile tobacco flavor component, or a liquid including a non-tobacco material. The liquid storage may be formed to be detachable from the vaporizer 14 or may be formed integrally with the vaporizer 14.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 14 may be referred to as a cartomizer or an atomizer, but it is not limited thereto.

The aerosol generating device 1 may include other components in addition to the battery 11, the controller 12, the heater 13, and the vaporizer 14. For example, the aerosol generating device 1 may include a display capable of outputting visual information and/or a motor for outputting haptic information. Also, the aerosol generating device 1 may include at least one sensor (e.g., a puff detecting sensor, a temperature detecting sensor, a cigarette insertion detecting sensor, etc.). Also, the aerosol generating device 1 may be formed as a structure where, even when the cigarette 2 is inserted into the aerosol generating device 1, external air may be introduced or internal air may be discharged.

Although not illustrated in FIGS. 1 through 3, the aerosol generating device 1 and an additional cradle may form together a system. For example, the cradle may be used to charge the battery 11 of the aerosol generating device 1. Alternatively, the heater 13 may be heated when the cradle and the aerosol generating device 1 are coupled to each other.

The cigarette 2 may be similar to a general combustive cigarette. For example, the cigarette 2 may be divided into a first portion including an aerosol generating material and a second portion including a filter, etc. Alternatively, the second portion of the cigarette 2 may also include an aerosol generating material. For example, an aerosol generating material made in the form of granules or capsules may be inserted into the second portion.

The entire first portion may be inserted into the aerosol generating device 1, and the second portion may be exposed to the outside. Alternatively, only a portion of the first portion may be inserted into the aerosol generating device 1. Otherwise, the entire first portion and a portion of the second portion may be inserted into the aerosol generating device 1. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 1. For example, opening and closing of the air passage and/or a size of the air passage may be adjusted by the user. Accordingly, the amount and smoothness of smoke may be adjusted by the user. As another example, the external air may flow into the cigarette 2 through at least one hole formed in a surface of the cigarette 2.

Hereinafter, an example of the cigarette 2 will be described with reference to FIGS. 4 and 5.

FIGS. 4 and 5 are diagrams showing examples of cigarettes.

Referring to FIG. 4, the cigarette 2 may include a tobacco rod 21 and a filter rod 22. The first portion 21000 described above with reference to FIGS. 1 through 3 may include the tobacco rod, and the second portion may include the filter rod 22.

FIG. 4 illustrates that the filter rod 22 includes a single segment. However, the filter rod 22 is not limited thereto. In other words, the filter rod 22 may include a plurality of segments. For example, the filter rod 22 may include a first segment configured to cool an aerosol and a second segment configured to filter a certain component included in the aerosol. Also, as necessary, the filter rod 22 may further include at least one segment configured to perform other functions.

The cigarette 2000 may be packaged using at least one wrapper 24. The wrapper 24 may have at least one hole through which external air may be introduced or internal air may be discharged. For example, the cigarette 2 may be packaged using one wrapper 24. As another example, the cigarette 2 may be double-packaged using at least two wrappers 24. For example, the tobacco rod 21 may be packaged using a first wrapper 241, and the filter rod 22 may be packaged using wrappers 242, 243, 244. In addition, the cigarette 2 may be repackaged by a single wrapper 245. When each of the tobacco rod 21 and the filter rod 22 includes a plurality of segments, each segment may be packaged using wrappers 242, 243, 244.

The tobacco rod 21 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 21 may include other additives, such as flavors, a wetting agent, and/or organic acid. Also, the tobacco rod 21 may include a flavored liquid, such as menthol or a moisturizer, which is injected to the tobacco rod 21.

The tobacco rod 21 may be manufactured in various forms. For example, the tobacco rod 21 may be formed as a sheet or a strand. Also, the tobacco rod 21 may be formed as a pipe tobacco, which includes tiny bits cut from a tobacco sheet. The tobacco rod 21 may be surrounded by a heat conductive material. For example, the heat-conducting material may be, but is not limited to, a metal foil such as aluminum foil. For example, the heat conductive material surrounding the tobacco rod 21 may uniformly distribute heat transmitted to the tobacco rod 21, and thus, the heat conductivity of the tobacco rod may be increased. As a result, the taste of the tobacco may be improved. Also, the heat conductive material surrounding the tobacco rod 21 may function as a susceptor heated by the induction heater. Here, although not illustrated in the drawings, the tobacco rod 21 may further include an additional susceptor, in addition to the heat conductive material surrounding the tobacco rod 21.

The filter rod 22 may include a cellulose acetate filter. Shapes of the filter rod 22 are not limited. For example, the filter rod 22 may include a cylinder-type rod or a tube-type rod having a hollow inside. Also, the filter rod 22 may include a recess-type rod. When the filter rod 22 includes a plurality of segments, at least one of the plurality of segments may have a different shape.

Also, the filter rod 22 may include at least one capsule 23. Here, the capsule 23 may generate a flavor or an aerosol. For example, the capsule 23 may have a configuration in which a liquid containing a flavoring material is wrapped with a film. For example, the capsule 23 may have a spherical or cylindrical shape, but is not limited thereto.

Referring to FIG. 5, the cigarette 3 may include a front-end plug 33. The front-end plug 33 may be located on a side of the tobacco rod 31, the side not facing the filter rod 32. The front-end plug 33 may prevent the tobacco rod 31 from being detached and may prevent the liquefied aerosol from flowing from the tobacco rod 31 into an aerosol generating device during smoking.

The filter rod 32 may include a first segment 321 and a second segment 322. Here, the first segment 321 may correspond to the first segment of the filter rod 22 of FIG. 4, and the second segment 322 may correspond to the third segment of the filter rod 22 of FIG. 4.

The diameter and the total length of the cigarette 3 may correspond to the diameter and the total length of the cigarette 2 of FIG. 4.

The cigarette 3 may be wrapped by at least one wrapper 35. At least one hole through which outside air flows in or inside gas flows out may be formed in the wrapper 35. For example, the front-end plug 33 may be wrapped by a first wrapper 351, the tobacco rod 31 may be wrapped by a second wrapper 352, the first segment 321 may be wrapped by a third wrapper 353, and the second segment 322 may be wrapped by a fourth wrapper 354. Also, the entire cigarette 3 may be re-wrapped by a fifth wrapper 355.

Also, at least one perforation 36 may be formed in the fifth wrapper 355. For example, the perforation 36 may be formed in a region surrounding the tobacco rod 31, but is not limited thereto. The perforation 36 may serve to transfer heat generated by the heater 13 shown in FIGS. 2 and 3 into the tobacco rod 31.

Also, the second segment 322 may include at least one capsule 34. Here, the capsule 34 may serve to generate a flavor or serve to generate an aerosol. For example, the capsule 34 may have a structure that a liquid containing perfume is wrapped in a film. The capsule 34 may have a spherical or cylindrical shape, but is not limited thereto.

FIG. 6 is a schematic block diagram of an aerosol generating device according to one or more exemplary embodiments;

Referring to FIG. 6, the aerosol generating device 1 according to one or more exemplary embodiments includes a battery 11, a controller 12, a heater 13, a pulse width modulation (PWM) processor 14, a display 15, a motor 16, a storage device 17, a detection signal generator 18a, a detection signal transmitter 18b, and a switch 19. Hereinafter, for convenience of explanation, general functions of the component included in the aerosol generating device 1 will be described first, and the operation of the controller 12 according to one or more exemplary embodiments will be described in detail.

The battery 11 supplies power to the heater 13, and the magnitude of the power supplied to the heater 13 may be adjusted by a control signal generated by the controller 12. According to some exemplary embodiments, a regulator for maintaining a constant voltage of the battery 11 may be provided between the battery 11 and the control unit 12.

The controller 12 generates and transmits control signals, thereby controlling the battery 11, the heater 13, the PWM processor 14, the display 15, the motor 16, the storage device 17, the detection signal generator 18a, and the detection signal transmitter 18b. Although not shown in FIG. 6, according to some exemplary embodiments, the aerosol generating device 1 may further include an input receiver for receiving button inputs or touch inputs of a user and a communicator for performing a communication with an external communication device like a user terminal. Also, although not shown in FIG. 6, the aerosol generating device 1 may further include a module for performing proportional integral derivative (PID) control for the heater 13.

In one or more exemplary embodiments, the controller 12 generates test signals and transmits the test signals to the detection signal generator 18a, periodically. When a liquid flows into the aerosol generating device 1, the controller 12 may receive a flooding detection signal corresponding to a test signal transmitted to the detection signal generator 18a from the detection signal transmitter 18b. On the other hand, when no liquid flows into the aerosol generating device 1, the controller 12 may only transmit a test signal to the detection signal generator 18a and may not receive a flooding detection signal corresponding to the transmitted test signal. The process that the controller 12 receives or does not receive a flooding detection signal corresponding to a test signal will be described below in detail with reference to FIGS. 8A and 8B.

The heater 13 generates heat due to specific resistance when a current is applied thereto, and aerosol may be generated when an aerosol generating substance is heated by the heated heater 13.

The PWM processor 14 enables the controller 12 to control power supplied to the heater 13 by transmitting a PWM signal to the heater 13. According to exemplary embodiments, the PWM processor 14 may be embedded in the controller 12, and a PWM signal output from the PWM processor 14 may be a digital PWM signal.

The display 15 visually outputs various alarm messages generated by the aerosol generating device 1, such that a user who uses the aerosol generating device 1 may check the alarm messages. A user may check a low battery power message or a susceptor overheat warning message displayed on the display 15, and stop the operation of the aerosol generating device 1 or take an appropriate measure before the aerosol generating device 1 is damaged.

The motor 16 is driven by the controller 12 and output various tactile messages to the user. For example, the motor 16 may allow a user to tactilely recognize that the aerosol generating device 1 is ready to be used.

The storage device 17 stores various information for the controller 12 to appropriately control power supplied to the heater 13 to provide a consistent flavor to a user of the aerosol generating device 1. The storage device 17 may not only be configured as a non-volatile memory like a flash memory, but also be configured as a volatile memory that temporarily stores data only when power is supplied thereto to secure a faster data input/output (I/O) speed.

When a liquid flows into at least one component accommodating space, which is provided on an outer surface of the aerosol generating device 1 to accommodate a removable component, through an opening as the removable component is accommodated into or removed from the component accommodating space, the detection signal generator 18a generates a flooding detection signal based on a test signal generated by the controller 12. In detail, the opening is closed when a removable component is accommodated in (i.e., attached to) the aerosol generating device 1 via the component accommodating space, and the opening remains open when the removable component is removed (i.e., detached) from the component accommodating space.

The component accommodating space is provided in the aerosol generating device 1. The component accommodating space for accommodating a removable component (e.g., a cigarette) in the aerosol generating device 1, the volume of the component accommodating space may be proportional to the volume of the removable component. The component accommodating space may include an opening for connection with the controller 12 of the aerosol generating device 1 through an internal circuit. A liquid may flow into the aerosol generating device 1 through the opening of the component accommodating space, which will be described below in detail with reference to FIG. 7.

In some exemplary embodiments, a cap (not shown) may be additionally provided to cover the opening while the removable component is not attached to the aerosol generating device 1. Although the cap covers the opening, it may not completely seal the opening. Therefore, there is a possibility that a liquid may still flow in the opening even when the opening is covered by the cap.

In an exemplary embodiment, the removable component may be a USB charging terminal or a cigarette 2 that is heated by a heater and generate aerosol. In the case of the USB charging terminal, the component accommodating space may be a space where the USB port is located. When the removable component is the cigarette 2, the component accommodating space may be a cigarette insertion hole.

The detection signal transmitter 18*b* receives a flooding detection signal from the detection signal generator 18*a* and transmits the flooding detection signal to the controller 12. For example, when a liquid flows into the aerosol generating device 1, the detection signal generator 18*a* may receive a test signal from the controller 12 and generate a flooding detection signal based on the received test signal. The detection signal transmitter 18*b* may transmit the generated flooding detection signal to the controller 12, such that the controller 12 may determine whether the aerosol generating device 1 is flooded based on the flooding detection signal.

In another example, when no liquid flows into the aerosol generating device 1, even when the detection signal generator 18*a* receives a test signal from the controller 12 and generates a flooding detection signal, the flooding detection signal is not transmitted to the transmitter 18*b*. In detail, when no liquid flows into the aerosol generating device 1, a circuit between the detection signal generator 18*a* and the detection signal transmitter 18*b* operates as an open circuit, and thus, even when a flooding detection signal is generated by the generator 18*a*, the flooding detection signal is not transmitted to the detection signal transmitter 18*b*. Detailed descriptions thereof will be given below with reference to FIGS. 8A and 8B.

The switch 19 may be located between the controller 12 and the detection signal generator 18*a* and is opened or closed to control transmission of a test signal generated by the controller 12 to the detection signal generator 18*a*. In FIG. 6, the switch 19 is not opened or closed by a particular element. Rather, when a liquid flows into the opening of the component accommodating space of the aerosol generating device 1, the switch 19 interconnects the controller 12 and the detection signal generator 18*a* when a short circuit occurs due to the liquid. To this end, the switch 19 is located within a pre-set distance from the opening of the component accommodating space.

On the other hand, when no liquid flows into the aerosol generating device 1, the switch 19 operates as an open circuit. In this case, the detection signal generator 18*a* is unable to generate a flooding detection signal based on a test signal. Otherwise, a flooding detection signal may be generated, the detection signal generator 18*a* is unable to transmit the flooding detection signal to the detection signal transmitter 18*b*. In FIG. 6, the switch 19 is located between the controller 12 and the detection signal generator 18*a*. However, according to other exemplary embodiments, the switch 19 may be located between the detection signal generator 18*a* and the detection signal transmitter 18*b*, or may be embedded in the detection signal generator 18*a*.

In one or more exemplary embodiments, when a liquid flows into the aerosol generating device 1, the flooding of the aerosol generating device 1 may be detected through a switch circuit which is shorted by the liquid, without a separate liquid sensor. As a result, a size of the aerosol generating device 1 may be reduced because it is not necessary to allocate a space for the liquid sensor in the aerosol generating device 1.

Also, according to one or more exemplary embodiments, flooding of the aerosol generating device 1 may be detected without using a relatively expensive liquid sensor, and thus the manufacturing cost of the aerosol generating device 1 may be significantly reduced.

FIG. 7 is a schematic view of an aerosol generating device according to one or more exemplary embodiments.

In detail, the aerosol generating device 1 of FIG. 7 includes not only the controller 12, the detection signal generator 18*a*, and the detection signal transmitter 18*b*, which are shown in FIG. 6, but also a cigarette insertion hole 710 an USB terminal 730, which correspond to a component accommodating space described above. FIG. 7 shows that there are two detection signal generators 18*a* and two detection signal transmitter 18*b*. However, the numbers of the detection signal generators 18*a* and the detection signal transmitters 18*b* may increase in proportion to the increased number of the component accommodating spaces. Also, although not shown in FIG. 7, the detection signal generator 18*a* or the detection signal transmitter 18*b* may include the switch 19 described above with reference to FIG. 6.

Hereinafter, a process that the controller 12 receives a flooding detection signal will be described with reference to in FIG. 7. For convenience of explanation, FIG. 6 will also be referred to.

First, the controller 12 periodically generates a test signal and transmits the test signal to the detection signal generator 18*a*. The detection signal generator 18*a* is located within a first pre-set distance from an opening of the cigarette insertion hole 710, which is one of component accommodating spaces.

Referring to FIG. 7, a first distance d between the detection signal generator 18*a* and the opening of the cigarette insertion hole 710 is shown. The first distance is pre-set to be sufficiently small such that a liquid 750 flowing in through the opening do not flood circuits other than the detection signal generator 18*a*. At this time, the detection signal generator 18*a* may include the switch 19 which may temporarily operate as a short circuit by the liquid 750. Also, a direction in which the first distance is measured may be one of a horizontal, a vertical, and a diagonal direction between the detection signal generator 18*a* and the opening, and the direction in which the first distance is measured in FIG. 7 may be an example.

As the switch 19 temporarily configures a short circuit due to the liquid 750, the detection signal transmitter 18*b* forms an electrically closed circuit with the detection signal generator 18*a*, and thus a flooding detection signal generated from a test signal by the detection signal generator 18*a* may be received. The detection signal transmitter 18*b* may transmit the received flooding detection signal to the controller 12 as-is or after performing first processing (e.g., filtering) on the flooding detection signal. The controller 12 may receive the flooding detection signal and determine that the liquid 750 is introduced through the opening of the cigarette insertion hole 710.

In an exemplary embodiment, instead of the detection signal generator 18*a*, the detection signal transmitter 18*b* may include the switch 19. In this case, the detection signal transmitter 18*b* may be located within a second pre-set distance from an opening of a component accommodating space such that the detection signal transmitter 18*b* may quickly detect the liquid 750 introduced through the opening. For example, the detection signal transmitter 18*b* may be located within a second pre-set distance from the opening of the cigarette insertion hole 710. Here, the second distance is defined as a distance between the opening of the component accommodating space and the detection signal transmitter 18*b*. According to exemplary embodiments, the second distance may be the same as the above-described first distance. As described above, the switch 19 that forms a short circuit due to the liquid 750 may be included in either the detection signal generator 18*a* or the detection signal transmitter 18*b*. Accordingly, depending on which of them includes the switch 19, the first distance or the second distance may be pre-set as a value for detecting flooding in the aerosol generating device 1.

After a flooding detection signal sent by the detection signal transmitter 18*b* is received, the controller 12 may determine whether the aerosol generating device 1 is flooded based on the received flooding detection signal.

Although the above description is given for a case where the component accommodating space is the cigarette insertion hole 710, it will be obvious to one of ordinary skill in the art that a flooding detection signal may be transmitted to the controller 12 in the same regard when the component accommodating space is the USB terminal 730.

FIG. 8A is a diagram showing a circuit when the switch is opened, according to an exemplary embodiment.

In detail, FIG. 8A shows the detection signal generator 18*a*, the detection signal transmitter 18*b*, the switch 19, and a ground 20, which are components of the aerosol generating device 1. In FIG. 8A, it is assumed that no liquid is introduced through an opening of the aerosol generating device 1.

First, the controller 12 may periodically generate a test signal and transmit the test signal to the detection signal generator 18*a*. The detection signal generator 18*a* is capable of generating a flooding detection signal based on the received test signal. However, when no liquid flows into an opening provided in a component accommodating space of the aerosol generating device 1, the switch 19 operates as an open circuit (i.e., the switch 19 is opened), and thus the detection signal generator 18*a* is unable to form a closed circuit. Therefore, a test signal transmitted by the controller 12 is not transmitted to the detection signal generator 18*a*.

Meanwhile, since the detection signal transmitter 18*b* is connected to the controller 12 regardless of opening or closing of the switch 19, a current output from the detection signal transmitter 18*b* flows toward the ground 20 through a resistor.

FIG. 8B is a diagram showing a circuit when the switch is closed, according to an exemplary embodiment.

In detail, FIG. 8B shows the detection signal generator 18*a*, the detection signal transmitter 18*b*, the switch 19, and a ground 20, which are components of the aerosol generating device 1. In FIG. 8B, it is assumed that a liquid is introduced through an opening of the aerosol generating device 1.

First, the controller 12 may periodically generate a test signal and transmit the test signal to the detection signal generator 18*a*. The detection signal generator 18*a* is capable of generating a flooding detection signal based on the received test signal. When a liquid flows into an opening provided in a component accommodating space of the aerosol generating device 1, the switch 19 operates as a short circuit, and thus the detection signal generator 18*a* may form a closed circuit. Therefore, a test signal transmitted by the controller 12 may be transmitted to the detection signal generator 18*a*, and the detection signal generator 18*a* may generate a flooding detection signal based on the test signal.

According to exemplary embodiments, the test signal and the flooding detection signal may include the same information, and the detection signal generator 18*a* may not include a separate signal generator and function as an element that the test signal simply passes through. A resistance value of a resistor element between the switch 19 and the ground 20 may be sufficiently large, such that the flooding detection signal (e.g., a current) generated by the detection signal generator 18*a* may be transmitted to the detection signal transmitter 18*b*.

When a short circuit formed by an introduced liquid is disengaged, the circuit of FIG. 8B may be returned to a circuit shown in FIG. 8A. As described above, according to exemplary embodiments, the switch 19 and the ground 20 connected to the resistor may be embedded in the detection signal generator 18*a* or the detection signal transmitter 18*b*. A circuit in which a ground connected to a resistor and a switch is located between elements to pull down a floating value is referred to as a pull-down circuit. The detection signal generator 18*a* or the detection signal transmitter 18*b* may be configured as a pull-down circuit.

In an exemplary embodiment, the detection signal generator 18*a* may generate a flooding detection signal based on a test signal received within a predetermined time after a liquid is introduced through the opening of the aerosol generating device 1. In this case, although the switch 19 is temporarily turned ON by the introduced liquid, a flooding detection signal may not be generated if a test signal is not received by the detection signal generator 18*a* within a predetermined time. To implement this exemplary embodiment, a period of transmission of test signals by the controller 12 may be appropriately determined based on experimental and empirical data.

FIG. 9 is a diagram showing a schematic comparison between a test signal transmitted by a controller and a flooding detection signal received by the controller.

The upper graph of FIG. 9 shows a waveform of a test signal transmitted by the controller 12. According to the upper graph of FIG. 9, a test signal transmitted by the controller 12 is formed as a high signal having a specific value (e.g., 3 V) for duration P. The test signal may be generated and transmitted to the detection signal generator 18*a* periodically every T seconds.

The lower graph of FIG. 9 shows a waveform of a flooding detection signal received by the controller 12, which is normalized for comparison with a test signal. According to the lower graph of FIG. 9, the flooding detection signal is not output when the first test signal is output, but the flooding detection signal is output when the second test signal is output in the second period. It may be seen from FIG. 9 that no liquid is introduced in the aerosol generating device 1 and the switch 19 is opened (i.e., turned off) before the first test signal is output, and a liquid is introduced in the aerosol generating device 1 and the switch 19 is closed (i.e., turned on) before the second test signal is output.

When a period in which both the test signal and the flooding detection signal are output, the controller 12 may determine that the aerosol generating device 1 is flooded. In another example, in a process for periodically transmitting a test signal, when no flooding detection signal is received or the waveform of a received flooding detection signal is not similar to the waveform of the test signal, the controller 12 may determine that the aerosol generating device 1 is operating normally without being flooded.

In an exemplary embodiment, the controller 12 may determine whether the aerosol generating device 1 is flooded based on a result of comparing a flooding detection signal with a pre-stored reference flooding signal, instead of comparing a test signal with the flooding detection signal. In this case, a process for normalizing a flooding detection signal according to the waveform of a test signal may be omitted, and the flooding detection signal may be immediately compared with a reference flooding signal to determine whether the aerosol generating device 1 is flooded. Information regarding the reference flood signal may be stored in the controller 12 or the storage device 17 shown in FIG. 6.

FIG. 10 is a flowchart of a method of detecting flooding of an aerosol generating device according to an exemplary embodiments.

Since the method of FIG. 10 may be implemented by the aerosol generating device 1 of FIG. 6, descriptions below will be given with reference to FIG. 6, and descriptions identical to those given above with reference FIG. 6 will be omitted.

First, the controller 12 periodically generates and transmits a test signal (operation S1010).

When a liquid is introduced through an opening of a component accommodating space (operation S1030), the switch 19 is turned ON by a short circuit formed by the introduced liquid (operation S1050).

When the controller 12 generates a new test signal and transmits the new test signal to the detection signal generator 18a within a predetermined time after the switch 19 is turned ON, the detection signal generator 18a generates a flooding detection signal based on the new test signal and transmits the flooding detection signal to the detection signal transmitter 18b (operation S1070). In operation S1070, the detection signal generator 18a and the detection signal transmitter 18b, which were electrically disconnected by the switch 19 turned OFF, are electrically connected to each other as the switch 19 is turned ON in operation S1050. As a result, the detection signal generator 18a and the detection signal transmitter 18b may exchange signals with each other.

The controller 12 may receive a flooding detection signal from the detection signal transmitter 18b and determine whether a liquid is introduced through the opening of the aerosol generating device 1 (i.e., whether the aerosol generating device 1 is flooded) based on the received flooding detection signal (operation S1090). According to exemplary embodiments, in order to determine whether a liquid is introduced through the opening of the aerosol generating device 1, the controller 12 may compare a flooding detection signal with a test signal or a pre-stored reference flooding signal, as described above with reference to FIG. 9. On determining that there is flooding, the controller 12 may output a notification of flooding through an output interface, such as a display, a motor, a speaker, etc.

In one or more exemplary embodiments, when a liquid flows into the aerosol generating device 1, the flooding of the aerosol generating device 1 may be detected through a switch which is short-circuited by the liquid without a separate liquid sensor. As a result, a size of the aerosol generating device 1 may be reduced because it is not necessary to allocate an independent space for the liquid sensor in the aerosol generating device 1. Also, according to one or more exemplary embodiments, flooding of the aerosol generating device 1 may be detected without using a liquid sensor, and thus the manufacturing cost of the aerosol generating device 1 may be reduced significantly.

One or more exemplary embodiments described above may be implemented in the form of a computer program that may be executed on a computer through various components, and such a computer program may be recorded in a computer-readable recording medium. At this time, the computer-readable recording medium may be a magnetic medium (e.g., a hard disk, a floppy disk, and a magnetic tape), an optical recording medium (e.g., a CD-ROM and a DVD), a magneto-optical medium (e.g., a floptical disk), and a hardware device specifically configured to store and execute program instructions (e.g., a ROM, a RAM, and a flash memory).

Meanwhile, the computer program recorded on the medium may be specially designed and configured for example exemplary embodiments or may be published and available to one of ordinary skill in computer software. Examples of computer programs include machine language code such as code generated by a compiler, as well as high-level language code that may be executed by a computer using an interpreter or the like.

Specific implementations described in one or more exemplary embodiments do not limit the scope of the inventive concept. For brevity of description, descriptions of conventional electronic components, control systems, software, and other functional aspects of the systems may be omitted. Furthermore, the connecting lines, or connectors shown in the various figures presented are intended to represent exemplary functional relationships and/or physical or logical couplings between the various elements, and it should be noted that many alternative or additional functional relationships, physical connections or circuit connections may be present in a practical device. Moreover, no item or component is essential to the practice of one or more exemplary embodiments unless the element is specifically described as "essential" or "critical".

The use of the terms "a" and "an" and "the" and similar referents in the context of describing one or more exemplary embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. One or more exemplary embodiments are not limited to the described order of the steps. The use of any and all examples, or exemplary language (e.g., "such as") provided herein, is intended merely to better illuminate the present disclosure and does not pose a limitation on the scope of one or more exemplary embodiments unless otherwise claimed. Numerous modifications and adaptations will be readily apparent to one of ordinary skill in the art without departing from the spirit and scope of one or more exemplary embodiments.

At least one of the components, elements, modules or units (collectively "components" in this paragraph) represented by a block in the drawings, such as the controller 12, the detection signal generator 18a, the detection signal transmitter 18b in FIGS. 1-3, 6-7 and 8A-8B, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

According to one or more exemplary embodiments, when a liquid is introduced through a space in which a removable component of an aerosol generating device is attached or detached, a user may quickly detect the introduction of the liquid and take an action, thereby minimizing damage to an aerosol generating device due to flooding.

In one or more exemplary embodiments, when a liquid flows into an aerosol generating device, the flooding of the aerosol generating device may be detected through a switch circuit which is shorted by the liquid without a separate liquid sensor. As a result, it is not necessary to allocate an independent space in a substrate of the aerosol generating device for the liquid sensor, and thus the aerosol generating device may be easily miniaturized.

Also, according to one or more exemplary embodiments, flooding of an aerosol generating device may be detected without using a relatively expensive liquid sensor, and thus significant reduction of the manufacturing cost of the aerosol generating device may be expected.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments. While one or more exemplary embodiments have been described with reference to the figures, it will be understood by those of ordinary skill in the art that various changes in form and details may be made therein without departing from the spirit and scope of the disclosure as defined by the following claims.

INDUSTRIAL APPLICABILITY

One or more exemplary embodiments may be used to manufacture a next-generation electronic cigarette.

The invention claimed is:

1. An aerosol generating device comprising:
at least one component accommodating space having an opening on an outer surface of the aerosol generating device and allowing a removable component to be accommodated therein through the opening;
a controller configured to periodically generate a test signal;
a detection signal generator configured to generate a flooding detection signal based on the test signal when a liquid is introduced through the opening; and
a detection signal transmitter configured to receive a generated flooding detection signal and transmit the received flooding detection signal to the controller,
wherein the controller is further configured to determine whether the aerosol generating device is flooded based on the flooding detection signal.

2. The aerosol generating device of claim 1, wherein the removable component is a universal serial bus (USB) charging terminal or a cigarette that contains an aerosol generating sub stance.

3. The aerosol generating device of claim 1, wherein the detection signal transmitter is configured to transmit the flooding detection signal to the controller after receiving the flooding detection signal from the detection signal generator.

4. The aerosol generating device of claim 1, wherein the detection signal generator is configured to generate the flooding detection signal based on the test signal being received within a predetermined time after the liquid is introduced.

5. The aerosol generating device of claim 1, wherein the detection signal generator is located within a first predetermined distance from the opening.

6. The aerosol generating device of claim 1, wherein the detection signal generator is electrically connected to the detection signal transmitter by the liquid introduced through the opening such that the detection signal transmitter receives the flooding detection signal from the detection signal generator.

7. The aerosol generating device of claim 1, wherein the controller determines whether the aerosol generating device is flooded based on a result of comparing the flooding detection signal with a pre-stored reference flooding signal.

8. A method of detecting flooding of aerosol generating device, the method comprising:
generating, by a controller, a test signal periodically;
generating, by the detection signal generator, a flooding detection signal based on the test signal when a liquid is introduced through an opening of at least one component accommodating space that is formed on an outer surface of the aerosol generating device and allows a removable component to be accommodated therein through the opening;
transmitting, by a detection signal transmitter, the flooding detection signal to the controller; and
determining, by the controller, whether the aerosol generating device is flooded based on the flooding detection signal.

9. The method of claim 8, wherein the removable component is a universal serial bus (USB) charging terminal or a cigarette that contains an aerosol generating substance.

10. The method of claim 8, wherein the transmitting of the flooding detection signal comprises receiving the flooding detection signal from the detection signal generator.

11. The method of claim 8, wherein the generating of the flooding detection signal comprises generating the flooding detection signal based on the test signal being received within a predetermined time after the liquid is introduced.

12. The method of claim 8, wherein the detection signal generator is located within a first predetermined distance from the opening.

13. The method of claim 8, wherein the transmitting of the flood detection signal comprises receiving, by the detection signal transmitter, the flooding detection signal from the detection signal generator after the detection signal generator is electrically connected to the detection signal transmitter by the liquid introduced through the opening.

14. The method of claim 8, wherein the determining comprises determining whether the aerosol generating device is flooded based on a result of comparing the flooding detection signal with a pre-stored reference flooding signal.

15. A computer-readable recording medium having stored thereon a computer program for executing the method of claim 8.

\* \* \* \* \*